Feb. 17, 1970          O. KOLB          3,496,309

PILOT CONTROLLED STEP-BY-STEP LEVEL REGULATOR

Filed Nov. 17, 1966          2 Sheets-Sheet 1 a.

b.

OTMAR KOLB
INVENTOR

BY

ATTORNEY

_United States Patent Office_

3,496,309
Patented Feb. 17, 1970

3,496,309
**PILOT CONTROLLED STEP-BY-STEP
LEVEL REGULATOR**
Otmar Kolb, Stuttgart-Weilimdorf, Germany, assignor to
International Standard Electric Corporation, New York,
N.Y., a corporation of Delaware
Filed Nov. 17, 1966, Ser. No. 595,225
Claims priority, application Germany, Nov. 23, 1965,
St 24,673
Int. Cl. H04b 3/20
U.S. Cl. 179—170.4         5 Claims

ABSTRACT OF THE DISCLOSURE

A pilot controlled level regulator is supplied which employs thermistors in which the heater current is varied step-by-step. The velocity of the heater current variation is chosen with respect to the time constant of the thermistor resistance variation in such a way that the regulated signal level is adjusted to a predetermined value, located between the predetermined tolerances, when the heater current variation is stopped. This arrangement is important when using transfluxors in pilot level regulation devices.

The invention relates to a pilot-controlled level regulator for the aperiodic regulation of a pilot level within defined tolerances of a nominal value.

Pilot-controlled level regulators are used for regulating the level in the carrier frequency technique, primarily in long-distance systems, particularly for multichannel systems, and they operate on the principle of backward, or feedback, regulation. To this end, one or several regulating networks are inserted into the transmission line which are influenced with reference to a predetermined nominal value, depending on the level of the received pilot frequency.

In order to obtain a certain stability of regulation in regulated systems the regulating units are designed to respond only when the deviations of the pilot level from a nominal value exceed a certain tolerance limit defined by the required exactness of regulation. Regulation is also suppressed on the occurrence of sudden heavy pilot level deviations, whereby the regulating value remains stored, having existed prior to such a deviation until the level of the pilot frequency is again within the predetermined operating range of the regulator.

By this latter measure the stability and the operability of the line is guaranteed in case of heavy attenuation and pilot frequency interference, e.g. on open wire lines. It furthermore enables very short regulating periods of the line after the line interruptions have been eliminated.

For carrier frequency equipments, operated in practice, electromechanical devices are conventionally used for level regulation. A small DC motor is used thereby as a storage which controls the attenuation regulating network either directly by switching elements or by means of indirectly heated thermistors. The motor is conventionally designed with a permanent magnetic field and driven by the values obtained from a difference voltage or current generator, the polarity of which is determined, depending on the condition of the pilot level deviation with reference to the nominal value of the direction. At sudden level deviations the motor is switched off and the value finally set is maintained. The German patent specification 1,164,-501 describes an arrangement in which the motor starts only when exceeding a predetermined deviation from the nominal value.

There are proposals known for electronically-controlled level regulators with a step-by-step setting. The principle of such a regulator is described with the aid of FIGS. 1 and 2 and thereupon the proposals known are discussed with the aid of this principle.

Figure 1:
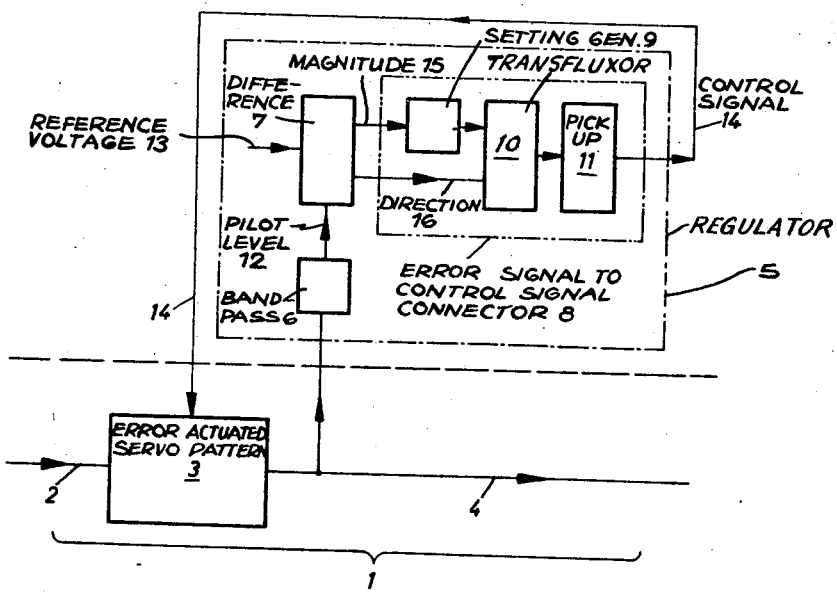

In FIG. 1 the regulated transmission line is designated with 1, consisting of the receiving line end 2, the error-actuated servo pattern 3 and the transmitting line end 4. 5 indicates the regulator, consisting of the pilot bandpass 6, the difference (amplifying) unit 7 and the error-signal/control signal converter 8. At the output of the error-actuated servo pattern 3 the pilot frequency is passed through the pilot bandpass 6 of the transmitting line end 4 and led, after conversion of its level into a proportional DC voltage in a rectifier arrangement not shown on the drawings, to the input of a difference unit 7 as pilot level 12 at the other input of which a DC voltage is applied as reference voltage 13, being analogous to the nominal value of the pilot level. The outputs of this difference unit 7 furnish two informations as error-signals, namely first the information, whether the pilot level 12 coincides, within the predetermined tolerances, with the reference level 13 or not, as a command either to regulate or not 15 and, second, the information in which direction the deviation took place when exceeding the tolerances, as a control direction of regulation 16. If the pilot level 12 exceeds the tolerances compared to the reference level 13 a storage device or transfluxor 10 is switched in the error-signal/control-signal converter 8 by the information "control direction of regulation" 16 for forward or backward counting. On the other hand, a setting generator 9 is started by the "command to regulate" 15 whereby through the pulses of said setting generator 9 the position of the storage or transfluxor 10 is changed.

Depending on the position of the storage device or transfluxor 10 a control signal pick-up 11 furnishes a control signal 14 being in proportion to the respectively set storage position, said control-signal influencing the error-actuated servo pattern 3. This control signal 14 may be for example an impressed direct current or an impressed DC voltage. If the error-actuated servo pattern 3 is influenced by the control signal 14 in such a way that the pilot level 12 again coincides, within the predefined tolerances, with the reference level 13, the setting generator 9 is switched off and the regulating process is completed.

Figure 2:
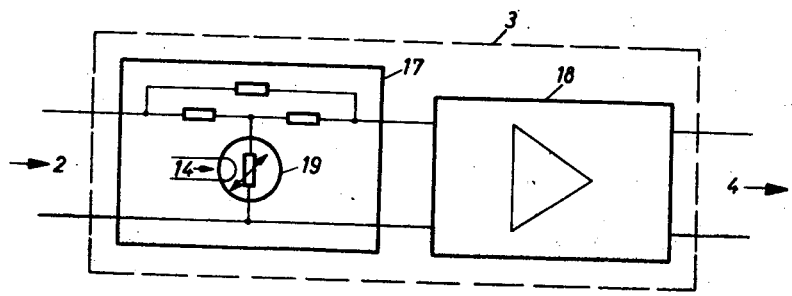
Figure 2:
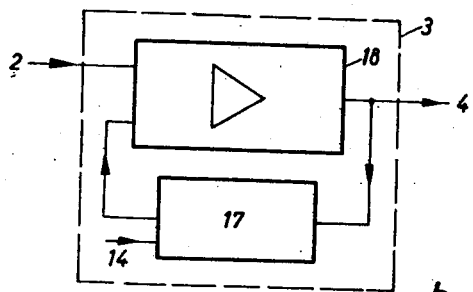

FIG. 2 shows two frequently used constructions of an error-actuated servo pattern 3 for a pilot-controlled level regulation. Said servo pattern consists of an amplifier 18 and a controlling network 17 with a control element 19. Thereby the controlling network 17 may be connected either in front or in rear of the amplifier 18 as an attenuator, or the controlling network 17 may be inserted into the negative feedback path of the amplifier 18. At present, indirectly heated thermistors are most frequently used as control element 19.

A device for level regulation, coinciding with the principles described in the foregoing, is now the object of the German patent specification 1,096,425. The following teachings are given for the repetition frequency of the setting generator 9 and the height of the step determined by the control signal pick-up 11. The repetition frequency will be selected so that a gradient of the attenuation of the controlling-network 17 therefrom results, being low compared to the keying frequency of carrier telegraphy, but at least as large as the maximum gradient of the line attenuation. The time constant of the conventional thermistors must permit a sequence in proportion to this step-by-step change of the heating current. The height of the steps and thus the required number of steps is determined so that the height of steps of the control signal 14 results in a pilot level change equal to the admissible tolerance, whereby the number of steps is then determined by the level change to be balanced at a maximum and the admissible tolerance. In other words, the time constant of the control element 19 and the repetition frequency of the setting generator 9 are selected so that the control element 19 has reached its resistance output value, corresponding to the momentary pilot level, after stepping up of the control signal 14, before the next step is made. Since, however, the height of the steps has been selected to be relatively large, a rather than a continuously variable transient time to the new regulating value is obtained, if the regulating process comprises several steps. The shape of the step-like curve is determined by the time constant of the thermistor used. The steps approach a continuous curve as the time constant of the thermistor becomes relatively smaller in comparison with the period of pulses of the setting generator 9.

A further development of such a pilot-controlled regulating system is described in the "Nachrichtentechnischen Zeitschrift" 1963 on the pages 341...348 by E. Bachle, and 1964 on the pages 521... 526 by J. Korn. There, too, the thermistor must have reached the resistance value corresponding to the momentary pilot level before the next following impulse of the setting generator 9, thereby selecting a smaller height of steps for the control signal 14. The aim of these measures is to obtain an approximately continual regulation at least by selecting sufficiently small regulating steps, if it is not possible to eliminate the effects of a step-by-step change of the control signal 14 on the attenuation itself. The German printed application 1,135,525 indicates an arrangement enabling a change of the regulating direction as quick as possible for a step-by-step, pilot-controlled level regulation.

It is a primary object of the invention to provide technical teachings for the aperiodic, continual regulation of a pilot level within the predetermined tolerances of a nominal value, with the aid of a pilot-controlled level regulator with a step-by-step setting.

To solve this problem a pilot-controlled level regulator is used in which, in a difference device the level of the received pilot is compared with a nominal value as reference level. At a predetermined difference in the level exceeding the permissible deviation of the level of the received pilot from the nominal value, the position of storage is changed by means of a setting generator, in accordance with the deviation direction. As a result of a change in storage a control signal pick-up changes the control signal which is led to a control element of an error-actuated servo pattern, step-by-step, until the level of the received pilot is within the predetermined tolerance. Once the received pilot switches off the setting generator, a further setting of the storage and, consequently, a further change of the control signal is suppressed. The problem is solved, according to the invention, by the controlling network of the error-actuated servo pattern which is designed so that, by a gradient of attenuation, actuated by a single step-function signal, the attenuation reaches an exponential function, nearly approximating with reference to time, that the repetition frequency of the setting generator is selected so high, that the cause of the effective control characteristic, resulting from the step-by-step change of the control signal, widely approaches a straight line, and that, furthermore, the height of steps, determined by the control signal pick-up, is selected so that the control signal per time unit changes in such a way that the straight line touches the exponential curve at the intersection B with the tolerance limit facing the direction of regulation and, when the step-by-step change of the control signal is continued beyond point B, the other tolerance limit, opposing the direction of regulation, is passed through from point B onward after a time $\geq \tau$.

A further embodiment of the invention comprises technical teachings to obtain the exact regulation of the controlled value to the tolerance limits of the nominal value or to the nominal value itself.

The invention is now in detail described with the aid of the accompanying drawings, wherein the figures already explained in the preamble show:

FIG. 1, the block diagram of a pilot-controlled level regulator with a step-by-step setting;

FIGS. 2a and 2b, examples to construct the error-actuated servo pattern for such a regulator.

Figure 3:
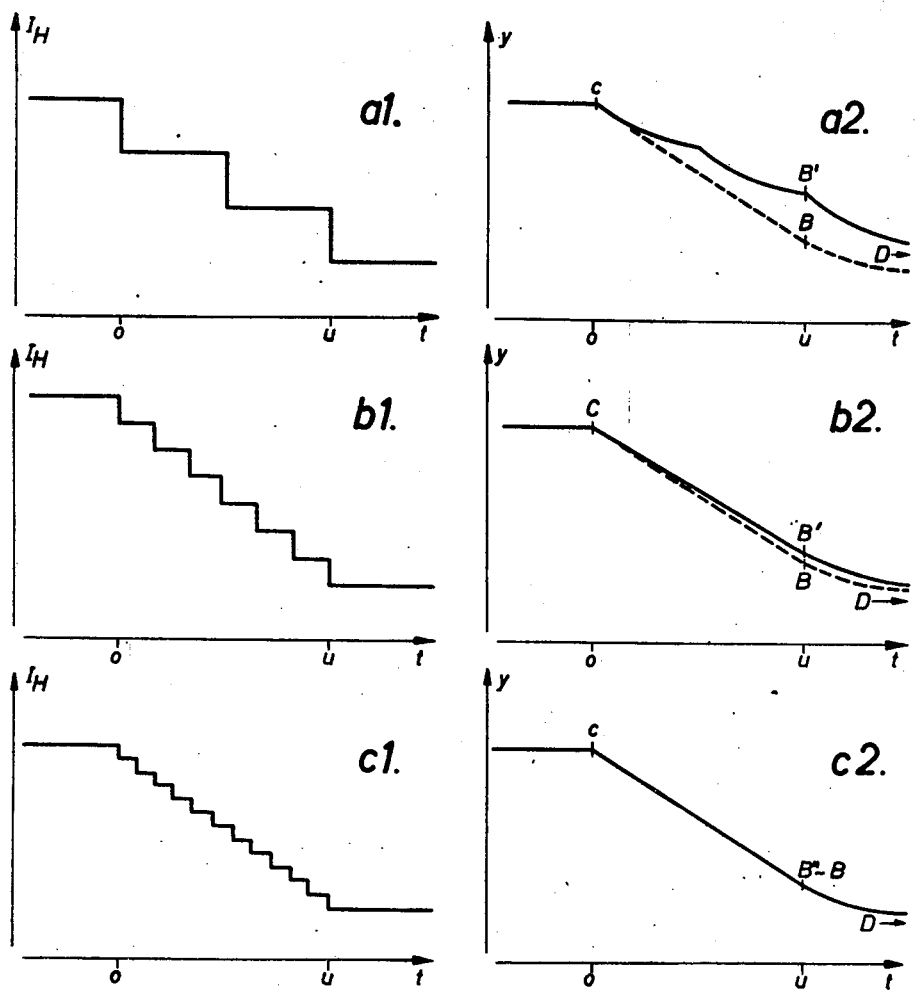
Figure 4:
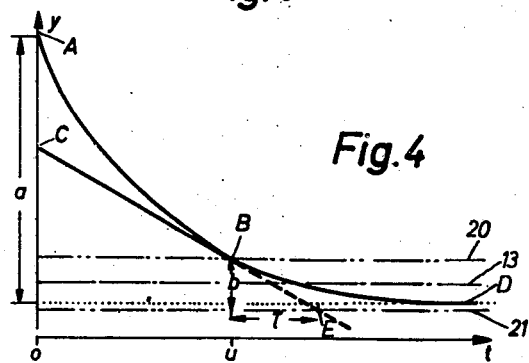

The FIGS. 3 and 4 explain in diagrams showing the time function, the regulator according to the invention, whereby:

FIG. 3 shows the measures to obtain a practically continual course of regulation at a step-by-step change of the control signal; and FIG. 4 shows the measures to achieve converging of the regulated value to a desired value being within the required tolerance range.

For the pilot-controlled level regulators described in the prior art which had a step-by-step setting, the thermistors had to be selected so that their resistance would be set before the central signal was changed again in response to another impulse of the setting generator 9. If $\tau$ designates the time constant of the thermistor and $t_1$ the steps, the following condition prevailed $t_1 \geq \tau$.

This requires that for thermistors with a high time constant the repetition frequency of the setting generator 9 must be very small. But this limits the reachable regulating speed and prevents a quick change of control direction. Consequently in the device described in the German patent specification No. 1,096,425, the height of steps of the level changes is selected equal to the admissible tolerance, that is equal to the possible maximum value. In the devices described in the literature ("Nachrichtentechnischen Zeitschrift") particular measures must be taken to reduce the effective setting period of the thermistors in order to obtain higher regulating speeds or smaller height of steps of the level changes for continuing the course at a then higher repetition frequency of the setting generator 9, whereby accelerating circuits are used. But an essential increase of the number of steps is not only limited by the high time constant of the thermistor but also by the increasing expenditure due to further bistable triggering stages of the storage or transfluxor 10. Since the storage position set is defined by current or voltage values, gained by summing up the units furnished from the individual trigger stages and associated in its balance, the possible tolerance limits of these values also limit an arbitrary increase of the number of steps. If the lowest-valued unit is within the tolerance of the highest-valued unit, a further stepping does not make sense and renders no technical advantage.

The operation of indirectly heated thermistors for the control element 19 renders big advantages, because in the physical separation of heater element and variable resistance an ample scope is given in designing the controlling network 17.

On the other hand the time constant of these indirectly heated thermistors is relatively limited on grounds of construction, insulation and life expectancy. According to experience the time constants of such thermistors are approximately between 1 and 10 seconds. If a regulating speed, also sufficient for open wire systems, shall be obtained at a sufficiently small stepping, (practically continuous change of the attenuation), other measures must be taken concerning the construction of the storage and concerning the method of setting. It is a desirable aim to perform this with conventional, indirectly heated thermistors. As the title of an article in "radio-mentor" (issue 6, 1963) by E. Bachle, corresponding in its contents with the publication in the "Nachrichtentechnischen Zeitschrift" shows, the task to be solved hitherto has been to secure a regulator within "electronic simulation of an electromechanic stepping motor." It would be desirable to have a regulator with the "electronic simulation of an electromechanical continual setting motor," which however avoids disadvantages of such a setting motor such as irregularities by friction, necessary maintenance etc. by the defined step-by-step setting. To explain the advantages therefrom resulting the author refers to the article by E. Koch in the "Fernmeldetechnischen Zeitschrift" 1951, pages 352 ... 361 on the "Uber die Pegelregelung langer Fernleitungen" (level regulation of long-distance lines), particularly the paragraphs 3.1 and 3.2 on page 355.

Summarizing, it can be stated that it is an object of the present invention to simulate the setting motor of a pilot-controlled level regulation electronically, whereby the advantages of a defined step-by-step setting shall be maintained in a continual regulation process.

As the article by E. Koch explains in a broad sense, even for open wire systems only natural, relatively slow changes of attenuation are encountered and a constant regulation speed is sufficient if this speed is higher than the attenuation gradient of the transmission line. For a step-by-step setting therefrom results a constant repetition frequency of the setting generator 9, independent from the deviation in regulating. In contrast to the systems hitherto used in which a new step was made only when the thermistor had reached its final value, that means $t_1 \geq \tau$, a small stepping time $t_1$ is selected compared to the time constant $\tau (t_1 < \tau)$. Demands are made when the step-by-step change of the control signal 14 is switched off when reaching the tolerance limit. The other tolerance limit is not exceeded, due to the still following converging of the thermistor to its final value, or the regulator shall converge even to its nominal value. It is possible to indicate how high the regulating speed should be at a maximum, resulting from the change of the control signal 14.

If it is assumed that, when switching on or off, or at a sudden change of the control signal 14, the time of the change of attenuation of the error-actuated servo pattern 3 follows an exponential function A–B–D (FIG. 4), then one of the following equation applies:

$$y = a \cdot e^{\frac{-t}{\tau}} \text{ or else } y = a \left(1 - e^{\frac{-t}{\tau}}\right)$$

In both of these equations $t$ represent the time, a maximum change of attenuation of the error-actuated servo pattern 3 in nepers, caused by a defined step function signal, $\tau$ its time constant and $y$ its attenuation in neper at the time $t$.

Now a tangent C–B (FIG. 4) can be drawn at the curve A–B–D that, starting at its touching point, the width $b$ of the tolerance range can be passed within the time $\tau$. Thereby the effective regulating speed shall be such that it corresponds to the rise of the tangent C–B. After the control signal 14 has passed point B (tolerance limit 20) said control signal is not changed anymore. But the attenuation still changes further according to the exponential function B–D until it reaches the other tolerance limit 21. The first derivation of the equation is given by:

$$\frac{dy}{dt} = -\frac{b}{\tau} \text{ or } \frac{dy}{ct} = +\frac{b}{\tau}$$

respectively.

At the conventional respond limits of ~±5%, corresponding to 50 mN from the nominal value $b = 100$ mN. At a time constant $\tau$ of 10 seconds the other tolerance limit is reached, at an effective regulating speed of $$\frac{dy}{dt} = \frac{100 \text{ mN}}{10 \text{ s.}} = 10 \text{ mN/s.}$$

This value is thus the maximum admissible regulating speed at which the other tolerance limit is just not exceeded. If the tangent C–B is inclined thus that at the intersection of the tolerance limit 20 at point B onward, the other tolerance limit is intersected in the time $2\tau$, the attenuation thins out to the reference level 13, after a further change of the control signal 14 at point B has ceased. Therefrom results a regulation speed $$\frac{dy}{dt} = \frac{100 \text{ mN}}{20 \text{ s.}} = 5 \text{ mN/s.} = 300 \text{ mN/min.}$$

which is sufficient for all long distance lines, as may be gathered from the article by E. Koch.

Regarding the previous explanations some assumptions were made which must be commented upon in order to enable technical realization. It has been assumed that the attenuation condition of the error-actuated servo pattern 3 shows an exponential curve at a single step-function signal of the control signal 14 over the time. As may be gathered from the explanation it is thereby sufficient if this is only approximated for the portion B–D of the curve. Such error-actuated servo patterns can be provided with indirectly heated thermistors. Due to the construction, more or less large deviations from such a curve may occur, but from the types available examples may be selected which show the desired curve.

It has been assumed furthermore that the effective regulating curve is a straight line and its inclination corresponds to the tangent C–B. It shall be investigated now whether and how such an effective regulation curve can be achieved despite a step-by-step change of the control signal. It is, as already indicated previously, a prerequisite that the time $t_1$ of the steps be small compared to the time constant $\tau$ of the control element 19. FIG. 3 serves as an explanation. The diagrams on the left side show different possibilities of the step-by-step change of the control signal 14, maintaining the speed of change. In this diagram the course of the heating current of a thermistor within the time unit is shown. On the right side the associated diagrams are shown on the attenuation resulting thereof also in the time unit. At a step-by-step change of the control signal the attenuation follows an exponential curve, but without ever reaching its final value prior to commencement of the new steps, due to the small stepping time compared to the time constant $\tau$. The smaller the number of steps the more the flat portion, too, of the exponential curve is within the individual step, the more deviates the resulting attenuation C–B from a continual curve, approaching a straight line. It is evident that at an infinite small stepping time the portion of the exponential curve passing per stage can be considered finally as a straight line and that also in this case the straight lines all show the same inclination so that the straight line C–B'' finally results in said curve. In practice this desired curve can be obtained with the aid of a storage device or transfluxor 10, the storing capacity of which comprises some hundred storage positions, rendering sufficient exactness. By proper selection of the stepping height or stepping time of the setting current changes the inclination of the straight line C–B'' can be made equal to the one of the tangent C–B.

However, the realization of such a multi-stage storage device or transfluxor 10 necessitates, as already discussed, a considerable expenditure, according to the publications giving teachings to the prior art, while the realization of the pertinent control signal pick-up 11 would not even render the desired success because of the already explained tolerances.

If the level regulator according to the invention shall show the mode of action described a less expensive multi-stage storage device or transfluxor 10 must be used and it must be secured that a sequence of setting pulses of the setting generator 9 renders a monotonous, step-by-step rising or decreasing of the control signal 14. Such a storage is now offered by a transfluxor. The correspondingly small-stepping setting of the permanent flux of such a transfluxor core is the object of the United States patent specifications 3,204,224; 3,221,311; and 3,262,103, therefore no further description is necessary. By the mechanism of the transfluxor setting and reading out it is also secured that the monotonous step-by-step change of the read-out storage condition corresponds to the setting, whereby this signal is then used as control signal 14, after proper conversion. Such read-out circuits and converters of the read-out storage signal, e.g. in an analogue impressed direct current, belong to prior art and are not objects of the present invention.

While the principles of the invention have been described above in connection with specific apparatus and applications, it is to be understood that this description is made only by way of example and not as a limitation on the scope of the invention.

What is claimed is:

1. A pilot-controlled level regulator for the aperiodic regulation of a pilot level within predetermined tolerances comprising, a difference unit for comparing a received pilot signal with a signal having a reference level, said difference unit providing a first correcting signal proportional to the magnitude of any difference beyond permissible tolerances and a second correcting signal indicative of the direction of any difference, a setting generator responsive to said first correcting signal indicating a deviation in the pilot level from the reference level exceeding a predetermined tolerance to change the condition of a storage device in a direction to compensate for the deviation in accordance with the amount of the deviation, said storage device responding to said second correcting signal to adjust its condition in a direction to compensate for the difference, a control signal pick-up responsive to the condition of the storage device to change step-by-step the control signal led to a control element of an error-actuated servo pattern, means responsive to arrival of the pilot level within the predetermined tolerance range to switch off the setting generator, said setting generator preventing further setting of the storage and further changes of the control signal, a controlling network in the error-actuated servo pattern designed to provide a gradient of attenuation to the control signal with reference to time comprising an exponential function over at least part of a curve, the setting generator having a repetition frequency sufficiently high that the course of the effective control characteristc resulting from the step-by-step change of the control signal approaches a straight line, the height of steps determined by the control signal pick-up being selected so that the control signal changes per time unit in a manner to cause a plot of the straight line to touch a plot of the exponential curve, the point of intersection of the curves representing a point of 100% desired regulation and points at either side representing less full regulation.

2. A pilot-controlled level regulator according to claim 1, in which in order to achieve an aperiodic approximation to the tolerance limit opposing the direction of regulation, after switching off the step-by-step change of the control signal at the point of intersection of the two curves, change of the control signal per time unit as determined by the height of the steps is selected to provide an effective regulation speed, whereby when the step-by-step change of the control signal beyond the point of intersection continues, the other tolerance limit is less rapidly approached.

3. A pilot-controlled level regulator according to claim 1, in which an indirectly heated thermistor is used as control element.

4. A pilot-controlled level regulator according to claim 1, in which a transfluxor circuit is used as the storage device.

5. A pilot-controlled level regulator according to claim 4, wherein the permanent flux of the transfluxor circuit can be changed in narrow steppings.

References Cited

UNITED STATES PATENTS

| | | | |
|---|---|---|---|
| 2,096,450 | 10/1937 | Curtis | 179—170 |
| 3,280,261 | 10/1966 | Korn | 179—170.4 |

FOREIGN PATENTS 1,138,110   10/1962   Germany.

KATHLEEN H. CLAFFY, Primary Examiner

JAN S. BLACK, Assistant Examiner

U.S. Cl. X.R.

333—16